(12) United States Patent
Singhal et al.

(10) Patent No.: US 11,775,264 B2
(45) Date of Patent: Oct. 3, 2023

(54) EFFICIENT DEPLOYMENT OF MACHINE LEARNING AND DEEP LEARNING MODEL'S PIPELINE FOR SERVING SERVICE LEVEL AGREEMENT

(71) Applicant: Tata Consultancy Services Limited, Mumbai (IN)

(72) Inventors: Rekha Singhal, Thane West (IN); Mayank Mishra, Thane West (IN); Dheeraj Chahal, Pune (IN); Shruti Kunde, Thane West (IN); Manju Ramesh, Thane West (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 218 days.

(21) Appl. No.: 17/446,726

(22) Filed: Sep. 2, 2021

(65) Prior Publication Data
US 2022/0214864 A1    Jul. 7, 2022

(30) Foreign Application Priority Data

Dec. 16, 2020   (IN) .............................. 202021054808

(51) Int. Cl.
| | |
|---|---|
| *G06F 9/44* | (2018.01) |
| *G06F 8/35* | (2018.01) |
| *G06N 20/00* | (2019.01) |
| *G06F 9/455* | (2018.01) |
| *G06F 16/901* | (2019.01) |

(Continued)

(52) U.S. Cl.
CPC .................. *G06F 8/35* (2013.01); *G06F 8/20* (2013.01); *G06F 9/455* (2013.01); *G06F 16/245* (2019.01); *G06F 16/9024* (2019.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2019/0266504 | A1* | 8/2019 | Apparao | G06F 9/5066 |
| 2019/0370695 | A1* | 12/2019 | Chandwani | G06F 18/217 |
| 2020/0125568 | A1* | 4/2020 | Idicula | G06N 20/20 |

(Continued)

FOREIGN PATENT DOCUMENTS

WO   WO2018184193 A1   10/2018

OTHER PUBLICATIONS

CN109447253 (Year: 2019).*

(Continued)

*Primary Examiner* — Insun Kang
(74) *Attorney, Agent, or Firm* — Finnegan, Henderson, Farabow, Garrett & Dunner LLP (57) ABSTRACT

This disclosure relates generally to configuring/building of applications. Typically, a deep learning (DL) application having multiple models composed and interspersed with corresponding transformation functions has no mechanism of efficient deployment on underlying system resources. The disclosed system accelerates the development of application to compose multiple models where each model could be a primitive model or a composite model itself. In an embodiment, the disclosed system optimally deploys a composable model application and transformation functions on underlying resources using performance prediction models, thereby accelerating the development and deployment of the application.

15 Claims, 8 Drawing Sheets

(51) Int. Cl.
    *G06F 8/20*     (2018.01)
    *G06F 16/245*     (2019.01)

(56) References Cited

U.S. PATENT DOCUMENTS

| | | | |
|---|---|---|---|
| 2020/0193266 A1* | 6/2020 | Scheidegger | G06N 3/04 |
| 2021/0263932 A1* | 8/2021 | Shaffer | G06F 16/24549 |
| 2021/0342668 A1* | 11/2021 | Malik | G06N 3/08 |
| 2022/0067245 A1* | 3/2022 | Steiger | G06N 5/01 |

OTHER PUBLICATIONS

Shiqing Fan et al., "DAPPLE: A Pipelined Data Parallel Approach for Training Large Models", Distributed, Parallel, and Cluster Computing, Jul. 2020, Arxiv, https://arxiv.org/pdf/2007.01045.pdf.

Daniel Sanchez et al, "Dynamic Fine-Grain Scheduling of Pipeline Parallelism", International Conference on Parallel Architectures and Compilation Techniques, October 2011, IEEE, https://ppl.stanford.edu/papers/pact11-sanchez.pdf.

Bowen Yang et al., "PipeMare: Asynchronous Pipeline Parallel DNN Training", Distributed, Parallel, and Cluster Computing—Machine Learning, Feb. 2020, Arxiv, https://arxiv.org/pdf/191005124.pdf.

* cited by examiner

EFFICIENT DEPLOYMENT OF MACHINE LEARNING AND DEEP LEARNING MODEL'S PIPELINE FOR SERVING SERVICE LEVEL AGREEMENT

PRIORITY CLAIM

This U.S. patent application claims priority under 35 U.S.C. § 119 to: India Application No. 202021054808, filed on 16 Dec. 2020. The entire contents of the aforementioned application are incorporated herein by reference.

TECHNICAL FIELD

The disclosure herein generally relates to efficient and accelerated application building, and, more particularly, to system and method for efficient deployment of machine learning (ML) and deep learning (DL) models' pipeline for serving service level agreements.

BACKGROUND

With advancing digital age, a huge volume of new information technology (IT) applications are being built that are associated with data analytics. The process of building these applications involves various steps, starting from data collection, data cleaning, ETL (extract, transform, load) and model building. Typically, most of these applications are built from scratch and undergoes each of the aforementioned processes. These applications utilize various machine learning (ML) and deep learning (DL) models. Building such IT applications every time from scratch is a time consuming and resource intensive process.

SUMMARY

Embodiments of the present disclosure present technological improvements as solutions to one or more of the above-mentioned technical problems recognized by the inventors in conventional systems. For example, in one embodiment, a method for efficient deployment of ML and DL models' pipeline for serving service level agreements is provided. The method includes receiving, via one or more hardware processors, a query for configuration of an application, the query comprising at least a metadata and a set of constraints associated with the configuration of the application, the set of constraints comprising a throughput constraint, a response time constraint and a cost constraint. Further, the method includes extracting, using the metadata, a set of source models from a model repository and a set of transformation functions from a transformer repository, via the one or more hardware processors. Moreover, the method includes creating a directed acyclic graph (DAG) composition using the set of source models and the set of transformation functions, the DAG composition representative of structure of the application. Also, the method includes determining, based on the DAG composition and the set of constraints, a plurality of target systems, via the one or more hardware processors, each target system of the plurality of target systems defines a hardware configuration for deploying the set of source models. Also, the method includes predicting, via the one or more hardware processors, resource consumption by each of the plurality of the target systems, by simulating mapping between execution of a plurality of inference requests on the DAG and the plurality of the target systems. Additionally, the method includes identifying, via the one or more hardware processors, one or more target systems from amongst the plurality of target system as one or more optimal target systems based on the resource consumption predicted for the plurality of the target systems, the optimal target system satisfying the cost constraint.

In another aspect, a system for efficient deployment of ML and DL models' pipeline for serving service level agreements is provided. The system includes a memory storing instructions, one or more communication interfaces; and one or more hardware processors coupled to the memory via the one or more communication interfaces, wherein the one or more hardware processors are configured by the instructions to receive a query for configuration of an application, the query comprising at least a metadata and a set of constraints associated with the configuration of the application, the set of constraints comprising a throughput constraint, a response time constraint and a cost constraint. Further, one or more hardware processors are configured by the instructions to extract, using the metadata, a set of source models from a model repository and a set of transformation functions from a transformer repository. Furthermore, one or more hardware processors are configured by the instructions to create a directed acyclic graph (DAG) composition using the set of source models and the set of transformation functions, the DAG composition representative of structure of the application. Moreover, one or more hardware processors are configured by the instructions to determine, based on the DAG composition and the set of constraints, a plurality of target systems, each target system of the plurality of target systems defines a hardware configuration for deploying the set of source models. Also, one or more hardware processors are configured by the instructions to predict resource consumption by each of the plurality of the target systems, by simulating mapping between execution of a plurality of inference requests on the DAG and the plurality of the target systems. Additionally, one or more hardware processors are configured by the instructions to identify one or more target systems from amongst the plurality of target system as one or more optimal target systems based on the resource consumption predicted for the plurality of the target systems, the optimal target system satisfying the cost constraint.

In yet another aspect, a non-transitory computer readable medium for efficient deployment of ML and DL models' pipeline for serving service level agreements is provided. The method includes receiving, via one or more hardware processors, a query for configuration of an application, the query comprising at least a metadata and a set of constraints associated with the configuration of the application, the set of constraints comprising a throughput constraint, a response time constraint and a cost constraint. Further, the method includes extracting, using the metadata, a set of source models from a model repository and a set of transformation functions from a transformer repository, via the one or more hardware processors. Moreover, the method includes creating a directed acyclic graph (DAG) composition using the set of source models and the set of transformation functions, the DAG composition representative of structure of the application. Also, the method includes determining, based on the DAG composition and the set of constraints, a plurality of target systems, via the one or more hardware processors, each target system of the plurality of target systems defines a hardware configuration for deploying the set of source models. Also, the method includes predicting, via the one or more hardware processors, resource consumption by each of the plurality of the target systems, by simulating mapping between execution of a plurality of inference requests on the DAG and the plurality of the target systems. Additionally, the method includes identifying, via the one or more hardware processors, one or more target systems from amongst the plurality of target system as one or more optimal target systems based on the resource consumption predicted for the plurality of the target systems, the optimal target system satisfying the cost constraint.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Building a new IT application is a cumbersome process as it involves various compute intensive processing steps including, but not limited to, data collection, data cleaning, ETL (extract, transform, load) and model building. The aforementioned steps have to be repeated for a variety of models embodied in the application. For example, a chat bot application is composed of a speech recognition model, a face recognition model an NLP model, and so on. Similarly, a document identification application can have text recognition model, table recognition model, a picture recognition model, and so on. As another example, for a text-to-speech conversion application, a text detection model may output boxes containing text in a document, which is input to the text recognition model. The text recognition model may recognize text in the box which is fed to speech model to speak it up. Such models that composes an application may herein after be referred to as 'composing models'. Most of such aforementioned models are machine learning (ML) or deep learning (DL) models. Performing all the compute intensive steps for each of such models while building a new application is a compute intensive and time-consuming process.

The disclosed method and system utilize existing composable models to build new applications. In an embodiment, an intelligent process automation pipeline is proposed that includes identifying a set of composable models from amongst a set of existing models associated with an application, and combining the selected existing composable models to configure the new IT application. In an embodiment, the composable models may be in a modular form that can be plugged in and out from the applications. These composable models may be black boxes and hence combining these models in a right way of profiling to get performance metric for optimal deployment is a challenging task. In particular, speeding up an application deployment and execution using these composable models is difficult.

COMPLETE DESCRIPTION OF EMBODIMENTS

Various embodiments disclose system and method to support building of application using composable models. The disclosed system allows systematic plug and play of composable models from the application while accelerating data transformation. In an embodiment, the disclosed system enables modular building of the application using the set of composable models includes obtaining a directed acyclic graph (DAG) of the multiple composable models and combining them to get final output. The DAG may assume, for example, a star structure, a tree structure and so on. According to the DAG, the output of one or more composable models may be input to one or more other composable models. For example, in an application for online shopping, an image recognition model may classify an input image to a product category, which is further input to a recommendation model to generate relevant advertisements. The recommendation may have many versions specific to environment, for instance, a version specific to pandemic, non-pandemic, and so on).

The disclosed system further accelerates repeated call of a source model since all the source models and additionally the real-time performance profiles of the source model may reside in the memory of the disclosed system.

The system utilizes parallelism and pipeline architecture for optimal allocation of cores to improve throughput and latency. In an embodiment, the disclosed system may receive constraints such as throughput constraint, latency constraint and a cost constraint from a user for the development and deployment of ML and DL models (composable models) the application.

In an embodiment, the disclosed system allows for tuning of the frameworks used for prediction/inference. In an embodiment, the disclosed system may include framework tuning knobs to accelerate model's inference. For instance, a model may be trained in framework 'A' and used for inference in framework 'B' (e.g. using open source ONNX model). The system maintains different versions of the model on CPU, FPGA, GPU, and so on, contextualizes the knowledge using performance models for heterogeneous hardware for optimal deployment.

In an embodiment, the models may be in a modular form that can be plugged in and out from the applications. In an embodiment, the disclosed embodiments provide a graphical user interface (GUI) for deployment of the disclosed system, wherein the GUI enables plugging in and out of the composable models while building an application. An example of the GUI is described further in the description below.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 7C, where similar reference characters denote corresponding features consistently throughout the figures, there are shown preferred embodiments and these embodiments are described in the context of the following exemplary system and/or method.

Figure 1:
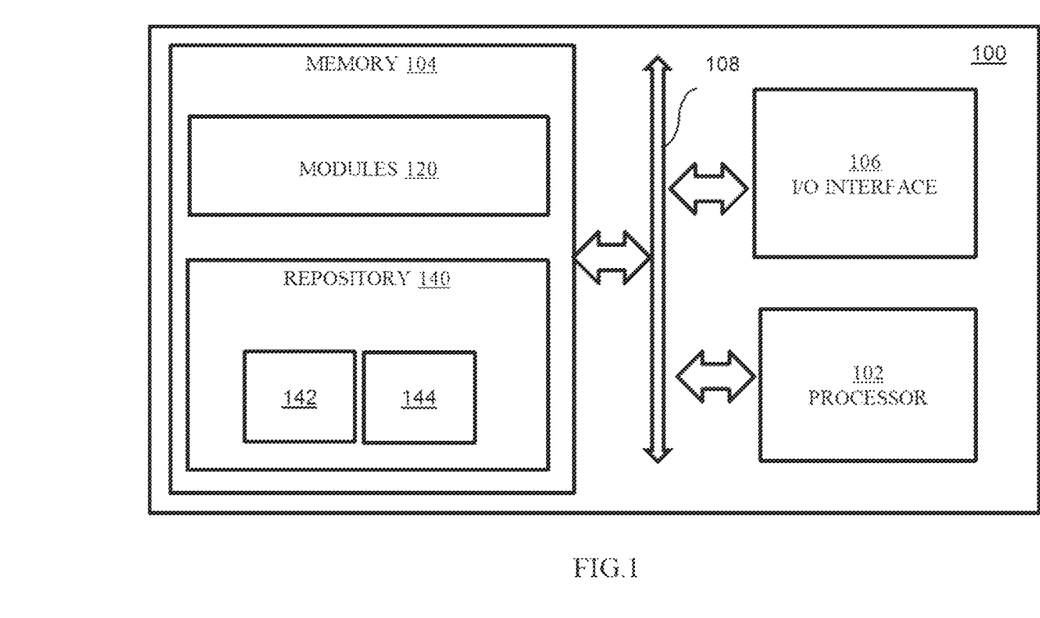
FIG. 1 illustrates a system for an efficient deployment of machine learning (ML) and Deep learning (DL) models' pipeline for serving service level agreement (SLA) according to some embodiments of the present disclosure.

FIG. 1 illustrates a block diagram of a system 100 for an efficient deployment of ML and DL models' pipeline for serving SLAs, according to some embodiments of the present disclosure. The disclosed system 100 is capable of accelerating development and deployment of an application consisting of composable models. The system 100 optimally deploys a composable model application and transformation functions on underlying resources using performance prediction models. The application may be built by implementing the application as composition of models in form of a complex directed acyclic graph (DAG).

In an embodiment, the system 100 facilitates querying for composition of the application. Upon receiving a query, the system 100 identifies constraints associated with the query and constructs a complex directed acyclic graph (DAG) based on the query and constraints. The DAG is indicative of the structure of the application. Depending on the models composition, the system 100 query meta data of transformation functions to get the corresponding function between a model's output to input of another model. For the purpose of clarity, some examples of building an application using composition of models are shown in FIGS. 2A-2C.

Figure 2A:
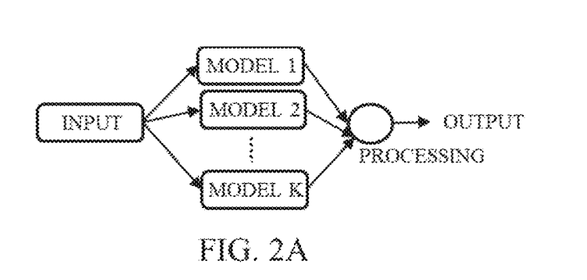
FIG. 2A represents a first form of a directed acyclic graph (DAG) for an application, according to some embodiments of the present disclosure.
Figure 2B:
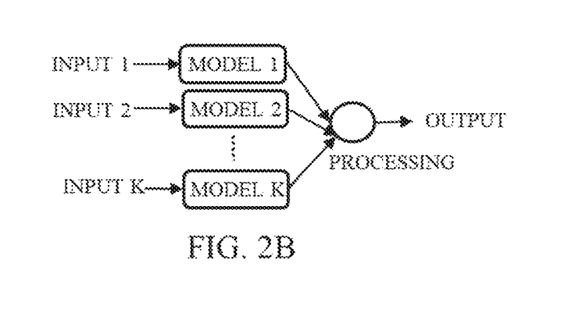
FIG. 2B represents a second form of a directed acyclic graph (DAG) for an application, according to some embodiments of the present disclosure.
Figure 2C:
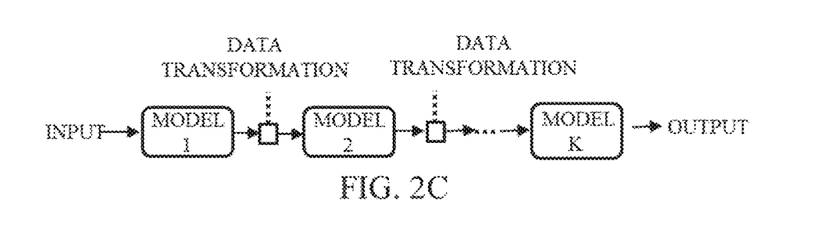
FIG. 2C represents a third form of a directed acyclic graph (DAG) for an application, according to some embodiments of the present disclosure.
Figure 2D:
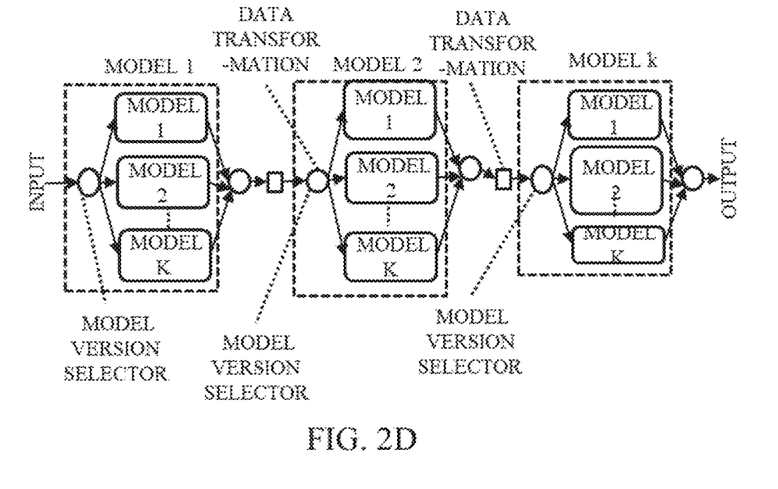
FIG. 2D represents a fourth form of a directed acyclic graph (DAG) for an application, according to some embodiments of the present disclosure.
Figure 2E:
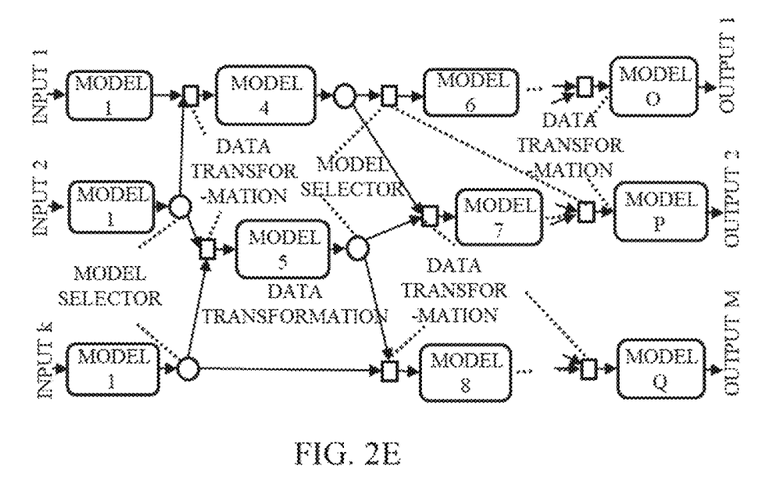
FIG. 2E represents a fifth form of a directed acyclic graph (DAG) for an application, according to some embodiments of the present disclosure.

As illustrated in FIGS. 2A-2C, the DAG for an application may assume any form of a DAG depending on the application requirements. For example, FIG. 2A illustrates an example of a linear composition wherein one model output is fed as input to another model. FIGS. 2B-2C illustrates a star composition where output from all models combines to one with same or different inputs going to a set of models. In an embodiment, the DAG may incorporate different versions of models as illustrated in FIG. 2D

Referring back to FIG. 1, the system 100 includes or is otherwise in communication with one or more hardware processors such as a processor 102, at least one memory such as a memory 104, and an I/O interface 106. The processor 102, memory 104, and the I/O interface 106 may be coupled by a system bus such as a system bus 108 or a similar mechanism. The I/O interface 106 may include a variety of software and hardware interfaces, for example, a web interface, a graphical user interface, and the like The interfaces 106 may include a variety of software and hardware interfaces, for example, interfaces for peripheral device(s), such as a keyboard, a mouse, an external memory, a camera device, and a printer. Further, the interfaces 106 may enable the system 200 to communicate with other devices, such as web servers and external databases. The interfaces 106 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 106 may include one or more ports for connecting a number of computing systems with one another or to another server computer. The I/O interface 106 may include one or more ports for connecting a number of devices to one another or to another server.

The hardware processor 102 may be implemented as one or more microprocessors, microcomputers, microcontrollers, digital signal processors, central processing units, state machines, logic circuitries, and/or any devices that manipulate signals based on operational instructions. Among other capabilities, the hardware processor 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 120 and a repository 140 for storing data processed, received, and generated by one or more of the modules 120. The modules 120 may include routines, programs, objects, components, data structures, and so on, which perform particular tasks or implement particular abstract data types.

The repository 140, amongst other things, includes a system database 142 and other data 144. The other data 144 may include data generated as a result of the execution of one or more modules in the modules. In an embodiment, the repository 140 may include a models repository and a transformers repository for storing the metadata and transformation functions, respectively associated with the source models. The metadata and transformation functions associated with the source models are described in detail further in description below.

Figure 3:
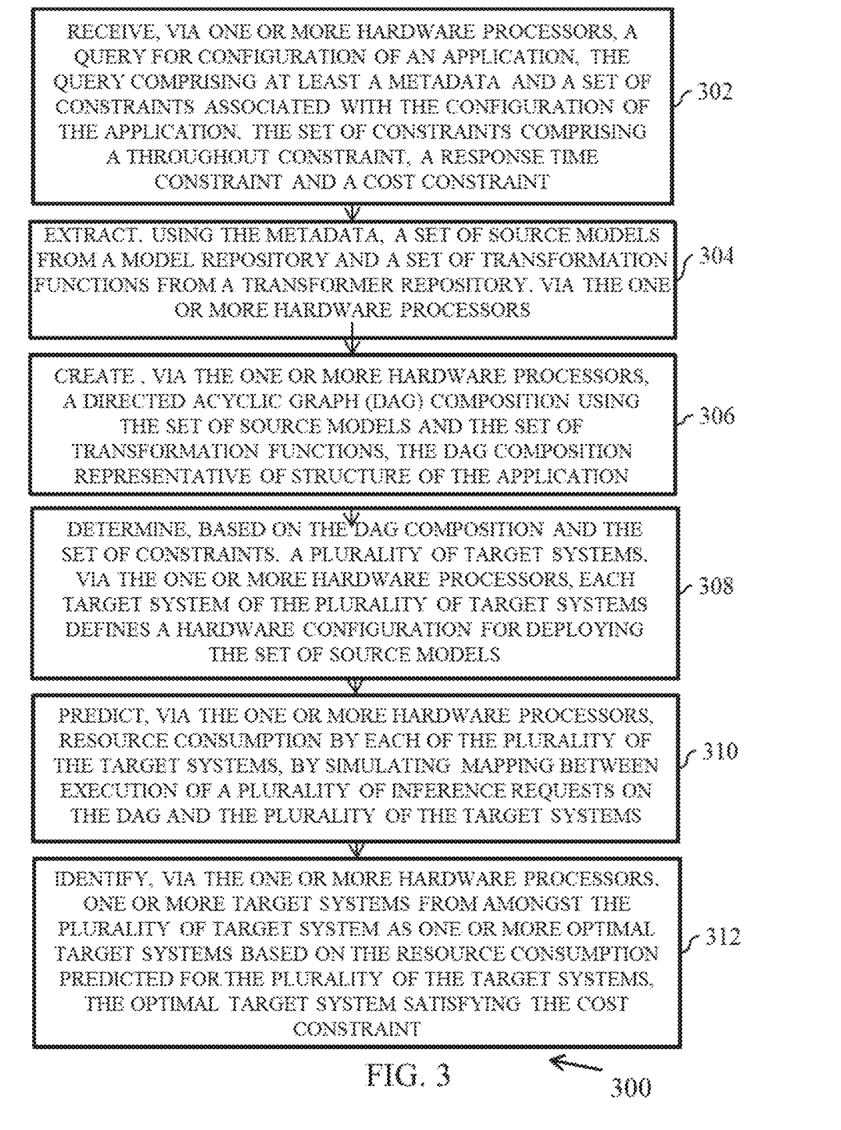
FIG. 3 illustrates a flow diagram of a method for an efficient deployment of ML and DL models' pipeline for serving SLA in accordance with some embodiments of the present disclosure.
Figure 4:
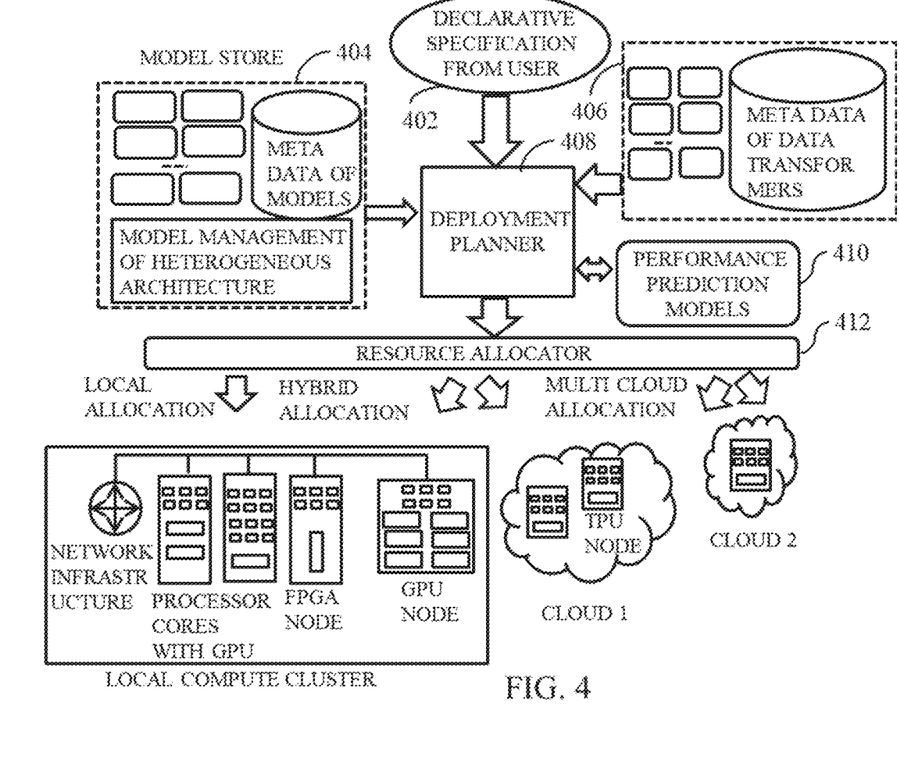
FIG. 4 is a block diagram illustrating a process flow for an efficient deployment of ML and DL models' pipeline for serving SLA in accordance with some embodiments of the present disclosure.

Referring collectively to FIGS. 3 and 4, an efficient deployment of ML and DL models' pipeline for serving SLA is depicted, according to some embodiments of the present disclosure. For example, FIG. 3 illustrates an example flow diagram of a method 300 for an efficient deployment of ML and DL models' pipeline for serving SLA, according to some embodiments of the present disclosure. FIG. 4 illustrates a block diagram illustrating a process flow for an efficient deployment of ML and DL models' pipeline for serving SLA in accordance with some embodiments of the present disclosure. The method 300 depicted in the flow chart may be executed by a system, for example, the system, 100 of FIG. 1. In an example embodiment, the system 100 may be embodied in a computing device.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 300 are described with help of system 100. However, the operations of the method 300 can be described and/or practiced by using any other system.

In an embodiment, the disclosed system 100 may be triggered upon receiving a query at 402 for building an IT application for performance of a task such that the task may require a sequence of models. For example, sequence of models to complete a conversation at a chat-bot application may include speech recognition model, face recognition model, natural language processing (NLP) model, and so on.

For the IT application's model composition, an input query 402 may be obtained from a user. The user may give an intent for building the IT application in a declarative manner. For example, the user may define a set of constraints for building the IT application. The constraints may include, for example, a latency constraint, a throughput constraint and a cost constraint. The latency constrain may represent a latency bound, i.e. an end-to-end latency bound for the IT application that may be mentioned in milli-seconds. The throughput constraint may be representative of throughput required in terms of number of inference (or prediction) requests to be supported by the IT application. The throughput constraint may be mentioned in terms of requests/seconds. The cost constraint may be cost per inference in terms of a currency (for instance in $).

The disclosed embodiments leverage/composes existing models to build a new IT application such that the deployment of pipeline of models (machine learning and deep learning models of the application) can be accelerated. Such existing DL and ML models may be referred to as source models. In an embodiment, the source models may be stored in a model repository 404. The model repository may further include metadata associated with the plurality of source models. Example of metadata associated with the plurality of source models may include, but are not limited to a model version, a number of features, size, and hardware deployment architecture of the source model. Additionally, transformation functions associated with the source models may be stored in a transformer repository. The transformer repository may further include metadata associated with the transformers. For example, the metadata associated with the transformers (or transformation functions) may include, but are not limited to, input and output formats, execution time, components of the source models capable of being connected in one of a pipeline and parallel configuration, and versions for one or more hardware and cloud architectures. Using the metadata, a set of source models is extracted from the model repository and a set of transformation functions is extracted from the transformer repository at 302, as is explained below.

Each of the source model for a specific use case (or the IT application) may have many versions based on, for example, a number of features associated with the source model, size of the model, hardware deployment architecture, and so on. The source models may be deployed using multiple hardware resources such as CPU, memory size, memory bandwidth, network; and software resources such as container, pods, docker, and so on. Depending on the composition of the source models, the meta data of transformation functions (stored at the transformers repository 406) is queried to get the corresponding function between a source model's output to input of another source model.

At 304, based on the metadata contained in the query and the set of constraints, a directed acyclic graph (DAG) composition including a set of source models associated with the IT application may be created. In an embodiment, the disclosed system may use SQL query to get relevant source models and transformation function and create a DAG therefrom at 306. Alternatively, the DAG composition may be obtained as a DAG of a set of source models (obtained from model repository) interspersed with a set of transformation functions (obtained from transformer repository). A front layer (for example, a UI described further with reference to FIG. 6) of the system capturing the declarative specification queries the meta data of source models to get a set of target models fulfilling the constraints (e.g. desired requirements specified in the user's query).

At 308, based on the DAG composition and the set of constraints, a plurality of target systems are determined. Each target system of the plurality of target systems defines a hardware configuration for deploying the set of source models. In an embodiment, the system 100 may include a deployment planner 408 to obtain the appropriate versions of the source models and transformation functions for heterogeneous architectures (for example, CPU, GPU, FPGA, and so on) and deployment modes (for instance, cloud and bare metal). Herein, the term 'deployment mode' may refer to putting the model for execution. Once an appropriate set of source models and transformation functions are tagged in the DAG, the DAG is sent to an execution engine.

The execution engine may have request for multiple such DAGs (for example, for different applications). A resource scheduler (or resource allocator 412) may check the available resources and schedule the DAG for its optimal execution. Examples of resource scheduler may include, but are not limited to resource scheduler of big data system such as Hadoop™ and Spark™. At 310, the method 300 includes predicting resource consumption by each of the plurality of the target systems, by simulating mapping between execution of a plurality of inference requests on the DAG and the plurality of the target systems. In an embodiment, simulating the mapping between execution of a plurality of inference requests on the DAG and the plurality of the target systems includes computing, on a discrete event simulator, a service demand of each of the plurality of source models based on a resource utilization and a duration of a resource utilizing by each of the plurality of source models for the plurality of inference requests.

In an embodiment, the discrete event simulator (hereinafter referred to as a 'simulator' for the brevity of description) simulates the multiple execution environment with multiple workloads. The simulator may consist of performance models of different types of hardware resources (such as CPU, memory size, memory bandwidth, network, and so on) and software resources (such as container, pods, docker, and do on). Each of the plurality of inference requests are executed over the plurality of target systems using multiple frameworks. The performance models may be built by characterizing the different sets of workloads over different types of resources. Further, a service demand is measured for each resource for a given set of workload and resources are modeled based on this demand. For example, 50% usage of CPU for a period of 70 second results in service demand of 0.50*70=35. Building of performance models is described further in detail below by referring to FIG. 5.

Figure 5:
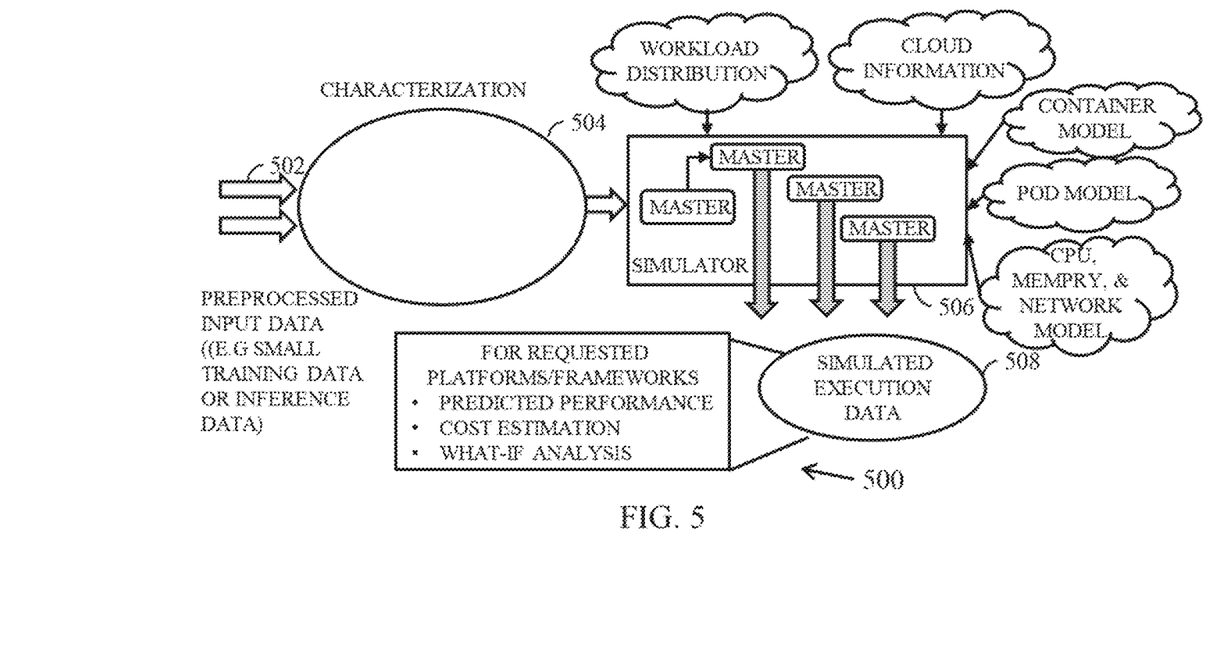
FIG. 5 illustrates an example representation of a process for predicting resource consumption by simulating workload execution in accordance with some embodiments of the present disclosure.

Referring now to FIG. 5, a process flow 500 for prediction by the performance models is described in accordance with an example embodiment. At 502, a small amount of pre-processed training data (or inference data) may be input as the workload to the simulator. The input is workload which may be a batch of jobs, continues stream, deterministic or non-deterministic represented by some distribution. This workload execution is simulated with the help of a discrete event simulation environment. The dependency among various jobs can be represented with the help of directed acyclic graph (DAG) and shared as input to the simulator. The characterization data generated in the previous step is also give as input. Along with this input to the simulator is hardware configuration for which workload needs to be simulated.

At 504, the workload may be characterized by short execution of inference requests over different types of target systems (i.e. hardware resources e.g. CPU, GPU, FPGA, TPUs and so on) using different types of frameworks such as MXNet, TensorFlow, PyTorch depending upon the application or model in use. A plurality of resource consumption parameters of the plurality of source models may be computed based on the service demand for each of the set of source models. Some of the resource consumption parameters are generic such as CPU utilization, memory bandwidth utilization, network bandwidth utilization and so on, while other resource consumption are application or model specific such as threads in enterprise applications or layers and neurons in neural networks. Resource models are built using this performance data.

At 506, the simulator may simulate execution of the plurality of inference requests. The simulator consists of a set of resource models developed or built from characterization data consisting of the plurality of resource consumption parameters. The set of resource consumption models facilitates in predicting the resource consumption by the plurality of source models when deployed on the plurality of target systems. Each resource that is used by application is modeled inside the simulator. The execution behavior of the application is replicated inside the simulator using the resource models. In case of distributed execution, different resources are connected using input and output ports. Some of the characteristics of the simulator are maintaining the current state of the system during execution of workload, scheduling workload appropriately amongst the available resources, and replicating the execution behavior of the workload with high granularity.

At 508, the output of the simulator is performance metrics such throughput, latency, resource utilization, cost estimate. The simulator can be used to perform what-if analysis as well e.g. effect of adding a new server on throughput, latency, and cost of the system. It has capability of predicting the bottleneck due to hardware scarcity. Hence, simulator can be used in making capacity planning decisions. In an embodiment, the simulator may embody a multi-objective function for efficient deployment of source models (DL and ML models') pipeline to serve the service level agreements. The service level agreement may be defined as the set of constraints of the multi-objective function.

A pseudo algorithm for the disclosed method is described below:

Here, the aim is to satisfy a Multi-objective function.
The input is defined as:
Let M be set of models such that M={m1, m2, m3, . . . , mn} represented as DAG (in FIGS. 2A-2E)
Let R be the target systems such that T={t1, t2, t3, . . . tq}.
If there are p unique resources available, then number of target systems to consider q=2^p.
Let SD represents the service demand of M on source systems S={s1, s2, s3, . . . su}.
Let user's specifications (in the query) and constraints parameters be P1, P2, P3, . . . , Pk, such that their values are defined by SLA L. For example, P1 can be throughput, P2 can be latency and P3 can be cost and so on.
Output:
Mappings of M to target system set Z, where, each element (target system) of Z satisfies L. Set Z can be empty.
Algorithm:
Initialize Simulator with M
i<-1
Z<-{ }//Empty set
While i<q
Initialize SD from S.
Map M to ri using simulation and generate P1i, P2i and P3i.
//For simulation both pipelined execution of different models and parallel execution of multiple copies of same model may be considered. It is assumed that every source model can be replicated for parallel execution to satisfy throughput constraint.
If (P1i satisfies P1 && P2i satisfies P2 && P3i satisfies P3)
Add ri to Z
//Z contains those set of target systems which satisfy L.

Figure 6:
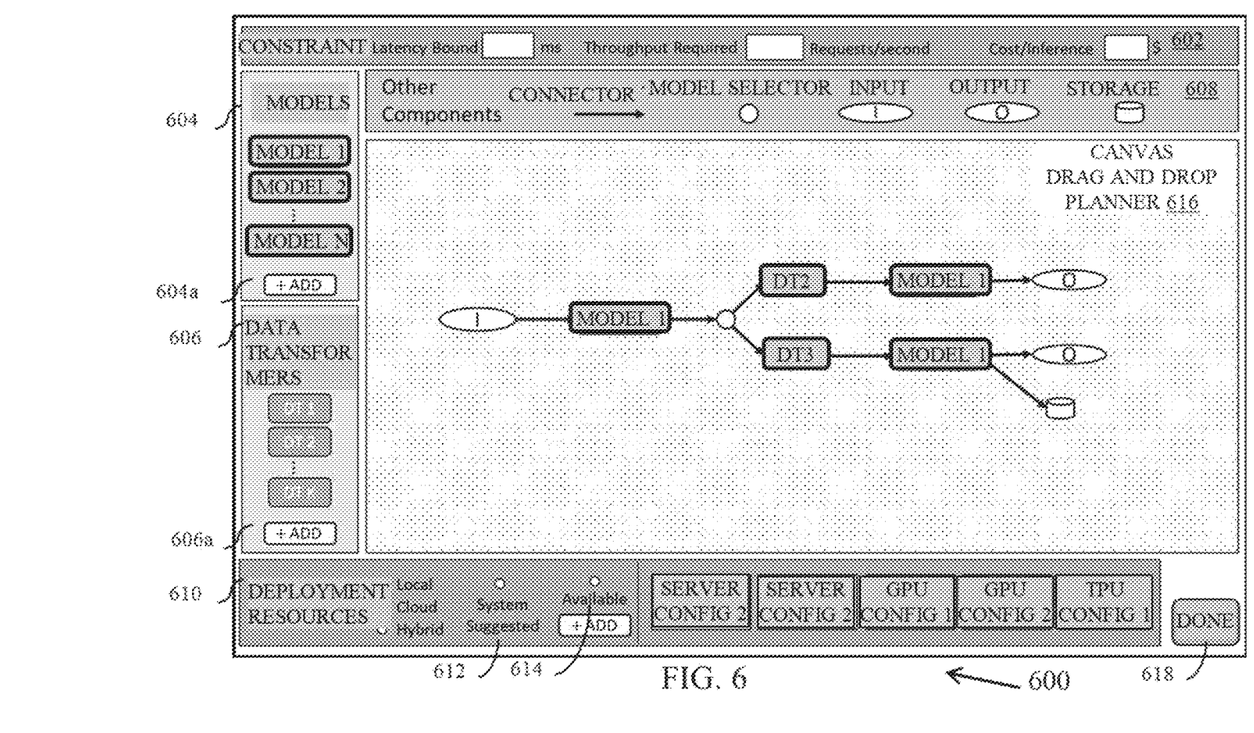
FIG. 6 illustrates an example UI for an efficient deployment of ML and DL models' pipeline for serving SLA, in accordance with some embodiments of the present disclosure.

FIG. 6 illustrates an example UI for an efficient deployment of ML and DL models' pipeline for serving SLA, in accordance with some embodiments of the present disclosure. As illustrated, the UI for the disclosed system 100 (FIG. 1) may include a constraints box 602, applicable models box 604, applicable data transformers 606, other components box 608, deployment resources box 610, system suggested 612, available 614, canvas box 616, and done button 618.

The constraints box 602 allows a user initiate an overall application building process by first filling the constraints mentioned in the Constraints box 602. In the present embodiment, three constraints are mentioned, namely, latency bound, throughput required, and cost per inference. The end to end latency bound for the application is mentioned in milli-seconds. The throughput includes number of prediction requests to be supported by the application. This may be mentioned as requests/seconds. The cost per inference may be presented in in $ or any other currency. Depending on the constraints mentioned in the constraints box 602, a list of models (and their versions) which satisfy the constrains are filtered and shown in the applicable models box 604. The "ADD" button 606a opens dialog to add more models to the library of available models. Depending on the constraints mentioned in the constraints box 602, the list of data transformers which satisfy the constraints are filtered and applicable data transformers 606. The "ADD" button 606a opens dialog to add more data transformers to the library of available models. There are several components available to define the end-to-end applications like "connectors", "Model Selectors", "Input", "Output", and "Storage", these are shown to be included in the other components box 608.

In the deployment resources box 610, the UI 600 gives option of selecting deployment resource estimation over local infrastructure, cloud-based infrastructure, and a hybrid of local and cloud infrastructure. Depending on the selection the actual cost per inference varies. There are two modes of deployment resource estimation, including system suggested mode and available mode. In system suggested mode, depending on the constraints entered and the application structure defined (models, data transformers) the system itself suggests the resources out of a list of pre-defined resources like server configurations, GPU etc. In the available mode, the user enters the list of resources available. The available resources also add to the constraints for filtering available models. For example, if there is no GPU in the available resource the models and their versions which only work on GPU will be filtered out from the Applicable model list. Similar filtering will be applied to Data Transformers. The canvas box 616 provides the space to define the model by dragging and dropping the models, data transformers and components from their respective boxes. The done button 618 gets enabled only when the application composition satisfies all the constraints.

Herein, it will be understood that the example UI 600 is described for an example scenario only, and should not be considered as limiting to the disclosed embodiments. In different variations of the implementation of the system, the UI for the same may assume different configurations. An example of Document Processing Application composing of Model DAG is described further with reference to FIGS. 7A-7C.

Figure 7A:
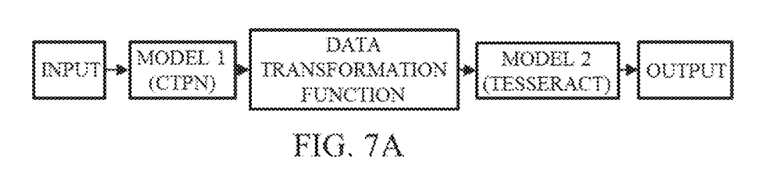
FIGS. 7A, 7B, and 7C illustrate a set of DAGs for an application, in an example scenario in accordance with some embodiments of the present disclosure
Figure 7B:
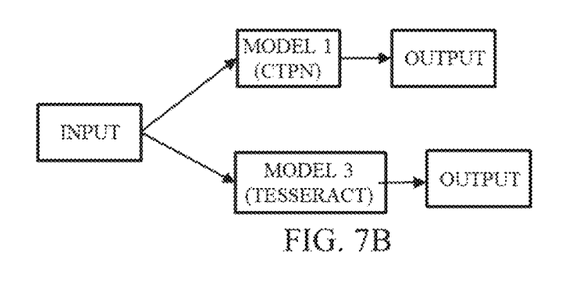
Figure 7C:
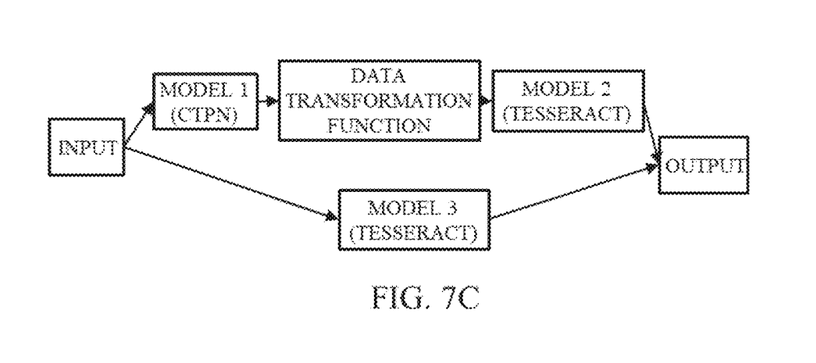

FIGS. 7A-7C illustrates a set of DAGs for an application, in an example scenario in accordance with some embodiments of the present disclosure. Herein, for the example scenario, the application to built is considered to be document processing application. The document processing application may be determined to include a source model 1 (CTPN) and another source model 2 (Tesserect). The system may configure three DAGs for the document processing application, as shown in FIGS. 7A-7C. FIG. 7A illustrates a linear DAG arrangement of models which can be executed in a) sequential as well as b) pipelined parallelism manner. FIG. 7B illustrates a DAG of the models 1 and 2 which can be executed in parallel manner. FIG. 7C illustrates a DAG of models which can be executed in a) Sequential architecture b) Parallel architecture (approach 1) where model1 and model2 are executed sequentially with model3 executing in parallel c) Parallel architecture (approach 2) where model1 and model2 executing in pipelined parallel manner with model3 parallelly. The results of experiments are described further with reference to tables 1, 2 and 3 presented below.

TABLE 1

Characterization and CPU Service demand of vision-based document processing application on source system for Model 1 (CTPN)- local servers

| Model | Core | Latency (seconds) | Memory (MB) | Input | Output | CPU Utilization (%) | Service demand |
|---|---|---|---|---|---|---|---|
| CTPN | 1 | 14.72338 | 965 | Image | Bounding box coordinates | 100 | 14.72337667 |
| CTPN | 2 | 8.378698 | 965 | Image | Bounding box coordinates | 135 | 11.31124277 |
| CTPN | 4 | 6.171713 | 965 | Image | Bounding box coordinates | 243 | 14.99726209 |
| CTPN | 8 | 5.165913 | 965 | Image | Bounding box coordinates | 327 | 16.8925356 |
| CTPN | 16 | 4.406479 | 965 | Image | Bounding box coordinates | 368 | 16.21584316 |
| CTPN | 24 | 4.260457 | 965 | Image | Bounding box coordinates | 426 | 18.14954868 |
| CTPN | 36 | 4.142976 | 965 | Image | Bounding box coordinates | 510 | 21.12917986 |
| CTPN | 48 | 3.76617 | 965 | Image | Bounding box coordinates | 620 | 23.35025662 |

TABLE 2

Characterization and CPU Service demand of vision-based document processing application on source system for Model 2 (Tesseract) - local server

| Model | Core | Latency (seconds) | Memory (MB) | Input | Output | CPU Utilization (%) | Service demand |
|---|---|---|---|---|---|---|---|
| Tesseract | 1 | 4.153 | 35 | List of images | Recognized text | 100 | 415.3 |
| Tesseract | 2 | 4.082 | 35 | List of images | Recognized text | 200 | 816.4 |
| Tesseract | 3 | 4.38 | 35 | List of images | Recognized text | 225 | 985.5 |
| Tesseract | 4 | 1.531 | 35 | List of images | Recognized text | 328 | 502.168 |

TABLE 2-continued

Characterization and CPU Service demand of vision-based
document processing application on source system for Model 2
(Tesseract) - local server

| Model | Core | Latency (seconds) | Memory (MB) | Input | Output | CPU Utilization (%) | Service demand |
|---|---|---|---|---|---|---|---|
| Tesseract | 8 | 1.479 | 35 | List of images | Recognized text | 449 | 664.071 |
| Tesseract | 16 | 1.543 | 35 | List of images | Recognized text | 320 | 493.76 |
| Tesseract | 24 | 1.566 | 35 | List of images | Recognized text | 394 | 617.004 |
| Tesseract | 36 | 1.644 | 35 | List of images | Recognized text | 270 | 443.88 |
| Tesseract | 48 | 1.488 | 35 | List of images | Recognized text | 286 | 425.568 |

TABLE 3

Memory, CPU, cost of vision-based document processing
application on source system for Model 1 and 2 (CTPN, Tesseract)
deployed over Cloud using FaaS resource. The deployment mapping
was generated using simulator

| Function | No. of requests per month | Memory allocated (MB) | Time (ms) per invocation | Compute time (GB-s) per invocation | Cost $ per month including free tier | Deployment Cost (in $) per month |
|---|---|---|---|---|---|---|
| CTPN | 100000 | 1856 | 48800 | 88.45 | 140.7502815 | 147.4169615 |
| CTPN | 100000 | 2048 | 48750 | 97.5 | 155.833645 | 162.500325 |
| CTPN | 100000 | 3008 | 48700 | 143.05625 | 231.7608802 | 238.4275602 |
| CTPN | 30000 | 1856 | 48800 | 88.45 | 37.55840845 | 44.22508845 |
| CTPN | 30000 | 2048 | 48750 | 97.5 | 42.0834175 | 48.7500975 |
| CTPN | 30000 | 3008 | 48700 | 143.05625 | 64.86158806 | 71.52826806 |
| Tesseract | 100000 | 256 | 50000 | 12.5 | 14.166695 | 20.833375 |
| Tesseract | 100000 | 512 | 25000 | 12.5 | 14.166695 | 20.833375 |
| Tesseract | 100000 | 1024 | 12000 | 12 | 13.33336 | 20.00004 |
| Tesseract | 100000 | 2048 | 5500 | 11 | 11.66669 | 18.33337 |
| Tesseract | 100000 | 3008 | 4300 | 12.63125 | 14.38544544 | 21.05212544 |
| Tesseract | 30000 | 256 | 50000 | 12.5 | 0 | 6.2500125 |
| Tesseract | 30000 | 512 | 25000 | 12.5 | 0 | 6.2500125 |
| Tesseract | 30000 | 1024 | 12000 | 12 | 0 | 6.000012 |
| Tesseract | 30000 | 2048 | 5500 | 11 | 0 | 5.500011 |
| Tesseract | 30000 | 3008 | 4300 | 12.63125 | 0 | 6.315637631 |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments disclosed herein provides method and system for accelerating the development of application needed to compose multiple models where each model could be a primitive model or a composite model itself. The embodiments of present disclosure herein addresses unresolved problem of inefficiency involved in building of the application. For example, in an embodiment, the disclosed system optimally deploys a composable model application and transformation functions on underlying resources using performance prediction models. Additionally, the disclosed system allows use of different versions and implementations of models.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A method comprising:
   receiving, via one or more hardware processors, a query for configuration of an application, the query comprising at least a metadata and a set of constraints associated with the configuration of the application, the set of constraints comprising a throughput constraint, a response time constraint and a cost constraint;
   extracting, using the metadata, a set of source models from a model repository and a set of transformation functions from a transformer repository, via the one or more hardware processors;
   creating a directed acyclic graph (DAG) composition using the set of source models and the set of transformation functions, the DAG composition representative of structure of the application;
   determining, based on the DAG composition and the set of constraints, a plurality of target systems, via the one or more hardware processors, each target system of the plurality of target systems defines a hardware configuration for deploying the set of source models;
   predicting, via the one or more hardware processors, resource consumption by each of the plurality of the target systems, by simulating mapping between execution of a plurality of inference requests on the DAG and the plurality of the target systems, wherein simulating the mapping between execution of the plurality of inference requests on the DAG and the plurality of the target systems comprises:
      computing, on a discrete event simulator, a service demand of each of a plurality of source models of the set of source models based on a resource utilization and a duration of a resource utilization by each of the plurality of source models for the plurality of inference requests, each of the plurality of inference requests executed overthe plurality of target systems using multiple frameworks;
      computing a plurality of resource consumption parameters of the plurality of source models based on the service demand for each of the plurality of source models of the set of source models;
      building a set of resource models using the plurality of resource consumption parameters; and
      predicting the resource consumption by the plurality of source models based on the set of resource models when deployed on the plurality of target systems; and
   identifying, via the one or more hardware processors, one or more target systems from amongst the plurality of target systems as one or more optimal target systems based on the resource consumption predicted for the plurality of the target systems, wherein the one or more optimal target systems satisfy the cost constraint.

2. The method of claim 1, wherein each source model of the plurality of source models is one of a machine learning (ML) model and deep learning (DL) model.

3. The method of claim 1, wherein the DAG composition comprises the set of source models interspersed with the set of transformation functions.

4. The method of claim 1, wherein receiving the query comprises receiving the set of constraints from a user.

5. The method of claim 1, wherein the DAG composition is one of a linear composition, a star composition, and a combination thereof.

6. The method of claim 1, wherein the model repository comprises metadata associated with the set of source models, and wherein the metadata associated with a model from amongst the set of source models comprises a version, a number of features, size, and hardware deployment architecture of the set of source models.

7. The method of claim 1, wherein the transformer repository comprises metadata associated with the transformers, and wherein the metadata associated with the transformers comprises input, output formats, execution time, components of the source models capable of being connected in one of a pipeline and parallel configuration, and versions for one or more hardware and cloud architectures.

8. A system, comprising:
a memory storing instructions;
one or more communication interfaces; and
one or more hardware processors coupled to the memory via the one or more communication interfaces, wherein the one or more hardware processors are configured by the instructions to:
receive, a query for configuration of an application, the query comprising at least a metadata and a set of constraints associated with the configuration of the application, the set of constraints comprising a throughput constraint, a response time constraint and a cost constraint;
extract, using the metadata, a set of source models from a model repository and a set of transformation functions from a transformer repository;
create a directed acyclic graph (DAG) composition using the set of source models and the set of transformation functions, the DAG composition representative of structure of the application;
determine, based on the DAG composition and the set of constraints, a plurality of target systems, each target system of the plurality of target systems defines a hardware configuration for deploying the set of source models;
predict resource consumption by each of the plurality of the target systems, by simulating mapping between execution of a plurality of inference requests on the DAG and the plurality of the target systems, wherein simulatingthe mapping between execution of the plurality of inference requests on the DAG and the plurality of the target systems comprises:
computing, on a discrete event simulator, a service demand of each of a plurality of source models of the set of source models based on a resource utilization and a duration of a resource utilization by each of the plurality of source models for the plurality of inference requests, each of the plurality of inference requests executed overthe plurality of target systems using multiple frameworks;
computing a plurality of resource consumption parameters of the plurality of source models based on the service demand for each of the plurality of source models of the set of source models;
building a set of resource models using the plurality of resource consumption parameters; and
predicting the resource consumption by the plurality of source models based on the set of resource models when deployed on the plurality of target systems; and
identifying one or more target systems from amongst the plurality of target systems as one or more optimal target systems based on the resource consumption predicted for the plurality of the target systems, wherein the one or more optimal target systems satisfy the cost constraint.

9. The system of claim 8, wherein each source model of the plurality of source models is one of a machine learning (ML) model and deep learning (DL) model.

10. The system of claim 8, wherein the DAG composition comprises the set of source models interspersed with the set of transformation functions.

11. The system of claim 8, wherein receiving the query comprises receiving the set of constraints from a user.

12. The system of claim 8, wherein the DAG composition is one of a linear composition, a star composition, and a combination thereof.

13. The system of claim 8, wherein the model repository comprises metadata associated with the set of source models, and wherein the metadata associated with a model from amongst the set of source models comprises a version, a number of features, size, and hardware deployment architecture of the set of source models.

14. The system of claim 8, wherein the transformer repository comprises metadata associated with the transformers, and wherein the metadata associated with the transformers comprises input, output formats, execution time, components of the source models capable of being connected in one of a pipeline and parallel configuration, and versions for one or more hardware and cloud architectures.

15. One or more non-transitory computer-readable storage media comprising one or more instructions which when executed by one or more hardware processors cause:
receiving, a queryfor configuration of an application, the query comprising at least a metadata and a set of constraints associated with the configuration of the application, the set of constraints comprising a throughput constraint, a response time constraint and a cost constraint;
extracting, using the metadata, a set of source models from a model repository and a set of transformation functions from a transformer repository, via the one or more hardware processors;
creating a directed acyclic graph (DAG) composition using the set of source models and the set of transformation functions, the DAG composition representative of structure of the application;
determining, based on the DAG composition and the set of constraints, a plurality of target systems, via the one or more hardware processors, each target system of the plurality of target systems defines a hardware configuration for deploying the set of source models;
predicting, resource consumption by each of the plurality of the target systems, by simulating mapping between execution of a plurality of inference requests on the DAG and the plurality of the target systems, wherein simulatingthe mapping between execution of the plurality of inference requests on the DAG and the plurality of the target systems comprises:
computing, on a discrete event simulator, a service demand of each of a plurality of source models of the set of source models based on a resource utilization and a duration of a resource utilization by each of the plurality of source models for the plurality of inference requests, each of the plurality of inference requests executed overthe plurality of target systems using multiple frameworks;
computing a plurality of resource consumption parameters of the plurality of source models based on the service demand for each of the plurality of source models of the set of source models;
building a set of resource models using the plurality of resource consumption parameters;
predicting the resource consumption by the plurality of source models based on the set of resource models when deployed on the plurality of target systems; and
identifying one or more target systems from amongst the plurality of target systems as one or more optimal target systems based on the resource consumption predicted for the plurality of the target systems, wherein the one or more optimal target systems satisfy the cost constraint.

\* \* \* \* \*